United States Patent [19]

Perry

[11] Patent Number: 4,918,786
[45] Date of Patent: Apr. 24, 1990

[54] HINGE WITH LEAVES WHICH REINFORCE ONE ANOTHER AGAINST BENDING DEFLECTION

[76] Inventor: John C. Perry, 3170 Falcon Dr., Carlsbad, Calif. 92008

[21] Appl. No.: 270,442

[22] Filed: Nov. 8, 1988

Related U.S. Application Data

[63] Continuation of Ser. No. 35,746, Apr. 8, 1987, abandoned.

[51] Int. Cl.⁵ ............................ E05D 5/06; E05D 7/00
[52] U.S. Cl. ........................................ 16/365; 16/389; 16/DIG. 40
[58] Field of Search ................ 16/252, 365, 382, 389, 16/390, 391, 392, DIG. 40

[56] References Cited

U.S. PATENT DOCUMENTS

| | | | |
|---|---|---|---|
| 130,729 | 8/1872 | Long | 16/365 |
| 261,150 | 7/1882 | Gowen | 16/390 |
| 447,465 | 6/1892 | Smith . | |
| 498,569 | 5/1893 | Peterson . | |
| 600,161 | 3/1898 | Moore . | |
| 655,596 | 7/1900 | Bader | 16/390 |
| 820,995 | 5/1906 | Smith | 16/365 |
| 906,048 | 12/1908 | Mayo | 16/391 |
| 1,660,657 | 2/1928 | Regan . | |
| 1,988,085 | 1/1935 | Orlando . | |
| 2,584,111 | 2/1952 | Brenner et al. | 16/389 X |
| 3,081,053 | 3/1963 | Jarrell | 244/49 |
| 3,201,820 | 8/1965 | Desrosiers | 16/159 |
| 4,598,889 | 7/1986 | Remington | 244/87 |

FOREIGN PATENT DOCUMENTS

| 9024 | 7/1889 | United Kingdom | 16/391 |
|---|---|---|---|
| 17895 | 7/1910 | United Kingdom | 16/391 |

Primary Examiner—Richard K. Seidel
Assistant Examiner—William Scott Andes
Attorney, Agent, or Firm—Donald R. Nyhagen

[57] ABSTRACT

A hinge having at least three leaves pivotally joined along edges of the leaves and adapted for attachment to two members to be pivotally connected with at least one member secured to a pair of the leaves which are mutally inclined in such a way that each leaf of the pair resists bending of the other leaf of the pair. A present best mode embodiment of the hinge has four leaves and is designed primarily for use on so-called ultralight airplanes as aileron, rudder, and elevator hinges which are immune to fatigue stress failure. Another hinge embodiment is designed for use as a door hinge and has only three leaves.

4 Claims, 5 Drawing Sheets

HINGE WITH LEAVES WHICH REINFORCE ONE ANOTHER AGAINST BENDING DEFLECTION

This application is a continuation of application Ser. No. 035,746, filed Apr. 8, 1987, now abandoned.

FIELD OF THE INVENTION

This invention relates generally to hinges and more particularly to a novel multiple leaf hinge whose leaves reinforce one another against bending deflection under bending loads on the hinge, particularly vibrational bending loads which could cause fatigue stress failure of the hinge.

DESCRIPTION OF THE PRIOR ART

As will become evident from the ensuing description, the improved hinge of this invention may be used to advantage in many diverse applications. A particularly important application of the hinge, however, is on so-called ultra-light airplanes for pivotally mounting their elevators, rudders and ailerons. Such ultra-light airplanes are commonly referred to simply as ultralights and will be so referred to in this disclosure.

Ultralights are relatively small, simple, lightweight airplanes powered by a small gasoline engine and designed to hold one or two persons. An ultralight is used for relatively low cost recreational flying which is restricted to unoccupied areas. While they vary widely in size and design, most ultralights have a lightweight frame structure constructed of aluminum tubing and covered by a suitable fabric. An ultralight like a conventional airplane has pivotal control surfaces operable by the pilot. These control surfaces are ailerons, an elevator, and a rudder.

The ailerons, rudders and elevators of ultralights are commonly pivotally supported by FAA approved hinges which will be discussed later. Suffice to say here, that these FAA approved hinges are essentially conventional so-called piano hinges. The leaves of these hinges are riveted to frame tubes of the ailerons, rudders and elevator and their respective supporting parts, i.e. wings, and vertical and horizontal stabilizers.

The existing hinges suffer from a defect which this invention overcomes. This defect resides in the fact that the hinge leaves have essentially unsupported cantilevered portions between the rivets which secure the leaves to the frame tubes and the outer edges of the leaves along which the leaves are pivotally joined. The loads imposed on the contral surfaces in flight produce substantial bending stresses in these unsupported portions of the hinge leaves which thus constitute high stress points or regions in the hinges. Moreover, during flight, these high stress points of the hinges are subjected to continuous load reversals due to engine vibrations and other fluctuating load factors. As a consequence, over even a relatively brief lifetime, the leaves of the existing hinges are subjected to many hundreds of thousands or more of alternating stress cycles which tend to produce fatigue stress in the leaves and can conceiveably cause catastrophic failure of the hinges.

The present invention overcomes this inherent defect in the existing ultralight control surface hinges. As will appear from the later description, however, the improvement features of the present hinge which overcomes the defect in the existing ultralight control surface hinges avoids similar problems in other hinge applications. Accordingly, it is significant to note at the outset that while the improved hinge of the invention is particularly adapted for use on ultralight airplanes, the hinge may be used for other purposes.

SUMMARY OF THE INVENTION

According to its broader aspects, the present invention provides a hinge having at least three and in some cases four hinge leaves pivotally joined along edges of the leaves and adapted to attachment to two members to be pivotally connected. One member or each member is attached to a pair of the leaves which are inclined to one another so that each of the two leaves of a pair resists bending of the other leaf of the pair. In other words, the improved hinge has at least one pair of leaves which are attached to one member with the leaves inclined to one another to resist bending of each leaf and at least one additional leaf, and in some cases an additional pair of leaves, for connection to the other member. Thus, the hinge has at least three leaves including one leaf pair and may have four leaves including two leaf pairs.

Whether a hinge according to this invention has three or four leaves depends on the intended use of the hinge and more specifically on whether a particular use produces a leaf bending stress at only one side of the hinge pivot axis or at both sides of this axis. In some applications, notably the ultralight application discussed above, the hinge is subjected to bending stress at both sides of its pivot axis. Accordingly, the hinge must have four leaves including a first leaf pair for attachment to one member and a second leaf for attachment to the other member. Each leaf pair is attached to their respective member with the two leaves inclined to one another so that each leaf resists bending of the other.

Other applications exist, however, in which the hinge is subjected to a bending stress at one side only of its pivot axis. One such application which is pivotally mounting a door, will be described. In this case, the hinge need have only three leaves including a leaf pair for connection to the door support, with the two leaves inclined to resist bending of each leaf, and one additional leaf for attachment to the door.

The two leaves of a leaf pair of a present hinge may be pivotally or rigidly joined. Both types of hinges will be described. Pivotally joining the two hinge leaves of a leaf pair has the advantage of adjustability to accommodate attachment of the hinge to members of various sizes and shapes. If such adjustability is not a consideration, however, the two leaves may be rigidly joined.

DESCRIPTION OF THE PRIOR ULTRALIGHT HINGE

As mentioned, a particularly important use of the improved hinge of this invention is on ultralights, i.e. ultralight airplanes, for pivotally mounting their rudders, ailerons, and elevators. Before describing the improved hinge, it is worthwhile to briefly consider the prior ultralight hinge for these purposes and the inherent defect in such hinges.

Figure 1:
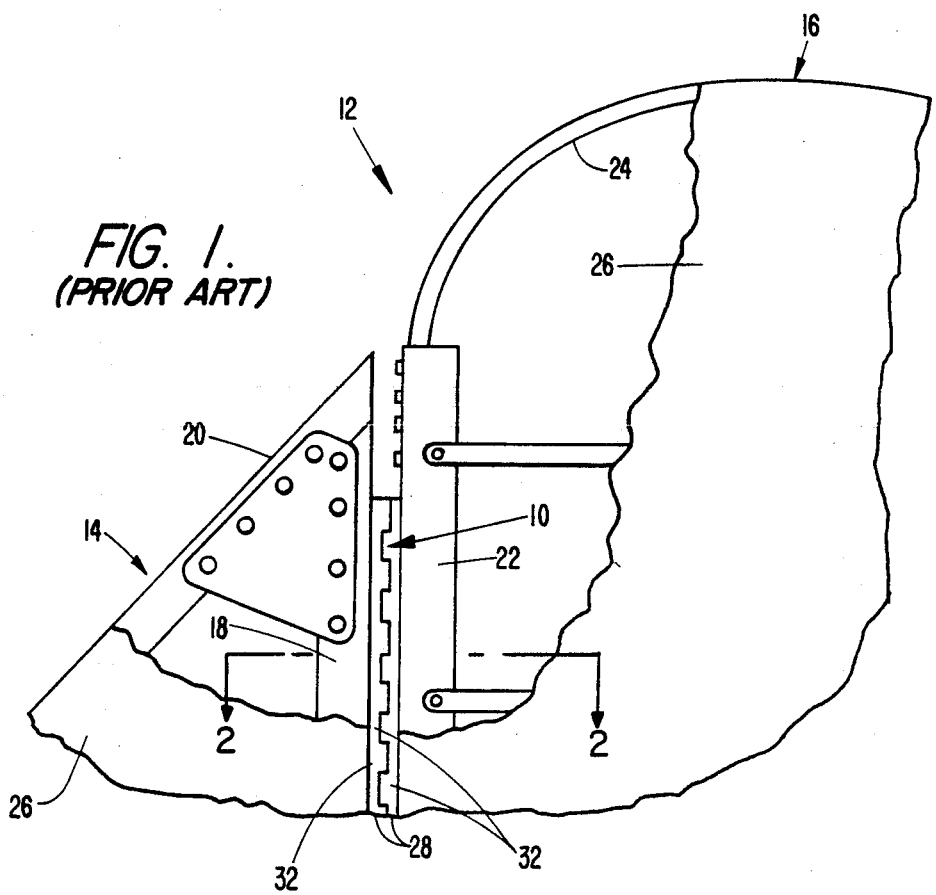
FIG. 1 is a side elevation of an ultralight airplane rudder assembly utilizing the existing FAA approved hinges.
Figure 2:
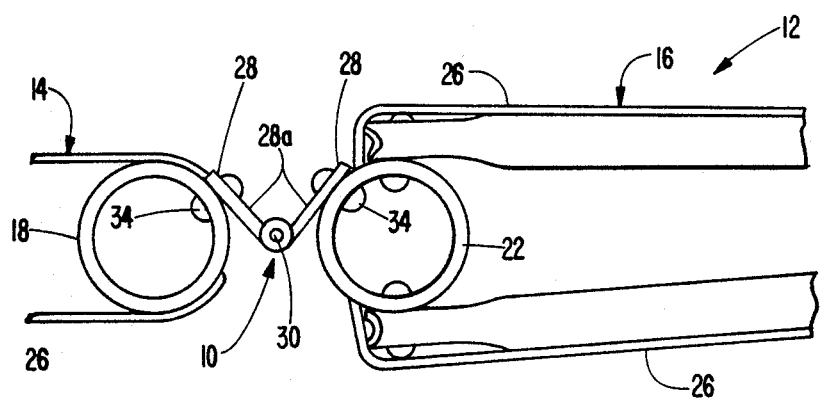
FIG. 2 is a section taken on line 2—2 in FIG. 1.

To this end, refer to FIGS. 1 and 2 illustrating the prior hinge 10 as it is used on an ultralight rudder assembly 12. The rudder assembly includes a vertical stabilizer 14 riged on the tail of the ultralight fuselage (not shown) and a rudder 16 proper at the rear of the stabilizer. The rudder assembly, like the remainder of the ultralight, has a frame structure constructed of aluminum tubing covered with a suitable fabric.

The stabilizer frame includes an upright trailing edge tube 18 and an inclined leading edge tube 20 rigidly fixed to one another and to the ultralight fuselage (not shown). The rudder frame includes a leading edge tube 22 adjacent and parallel to the stabilizer trailing edge tube 18, smaller diameter tubing 24 extending between and rigidly fixed at its ends to the upper and lower ends of the leading edge tube 22 and forming the upper, trailing, and lower edges of the rudder 16, and rib tubes extending between and rigidly fixed to the tube 22 and trailing edge tube. The stabilizer and rudder frames are covered with fabric 26.

The prior rudder hinge 10 comprises an essentially conventional so-called piano hinge, having two leaves 28 pivotally joined by a hinge pin 30 extending through interfitting bearing portions 32 of the leaves. As shown best in FIG. 2, the hinge leaves 28 are attached by rivets 34 to the stabilizer trailing edge tube 18 and the rudder leading edge tube 22 with the axis of the hinge pin 30 located midway between and in a plane containing the axes of the tubes. The rudder 16 is thereby supported on the stabilizer 14 for pivoting or rotation about the axis of the hinge pin 30.

An inherent defect of this prior rudder hinge is obvious from FIG. 2. Thus, each hinge leaf 28 has an unsupported, essentially cantilevered portion 28a between its rivets 34 and the hinge pin 30. It is evident that each hinge leaf portion 28a is subjected to substantial bending stresses in flight which are resisted only by the leaf itself. In other words, these hinge leaf portions 28a constitute stress points at which the leaves are prone to bending under the action of the forces exerted thereon in flight. Any bending of the leaves, of course, could seriously impair the rudder function.

The existence of the stress points 28a in the leaves of the existing hinges also presents a more serious hazard than simple bending of the leaves. Thus, during flight of an ultralight, the engine and aerodynamic forces produce vibrational and other alternating bending moments in the hinge stress points 28a which render the hinge leaves prone to fatigue failure.

The existing ultralight ailerons and elevators are mounted with the same type of hinges as the rudder. The aileron and elevator hinges are thus defective in the same way as the rudder hinge.

The improved hinge of this invention eliminates the above defects of the existing ultralight rudder, aileron, and elevator hinges. This improved hinge will now be described primarily in the context of its use on ultralights. As noted earlier and will become evident from the ensuing description, however, the improved hinge may be used for other purposes.

DESCRIPTION OF THE PREFERRED EMBODIMENTS

Figure 3:
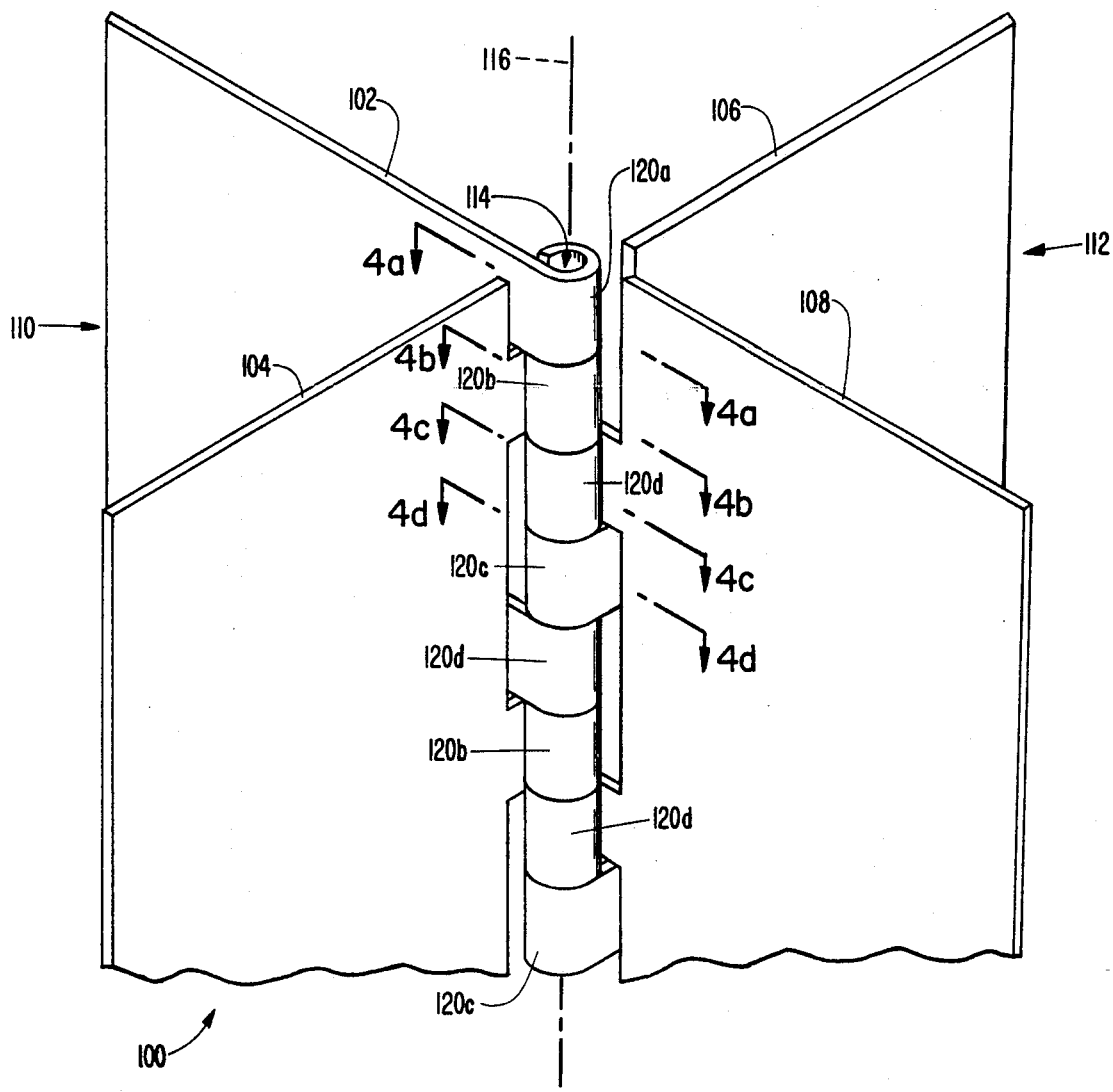
FIG. 3 is a perspective view of an improved four leaf hinge according to this invention.
Figures 4A, 4B:
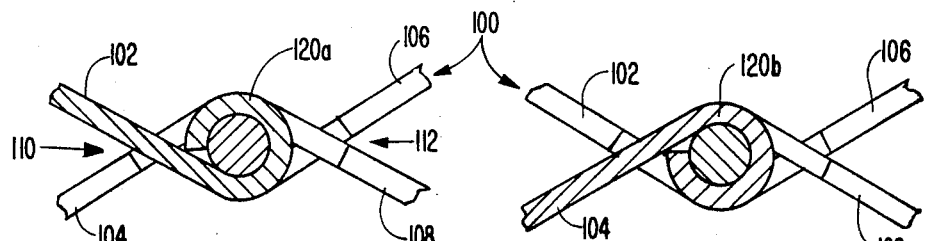
FIGS. 4a, 4b, 4c and 4d are enlarged sections taken on the corresponding numbered lines in FIG. 4.
Figures 4C, 4D:
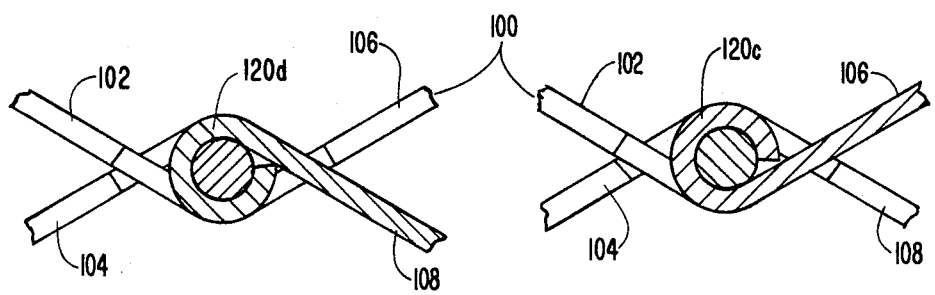
Figure 5:
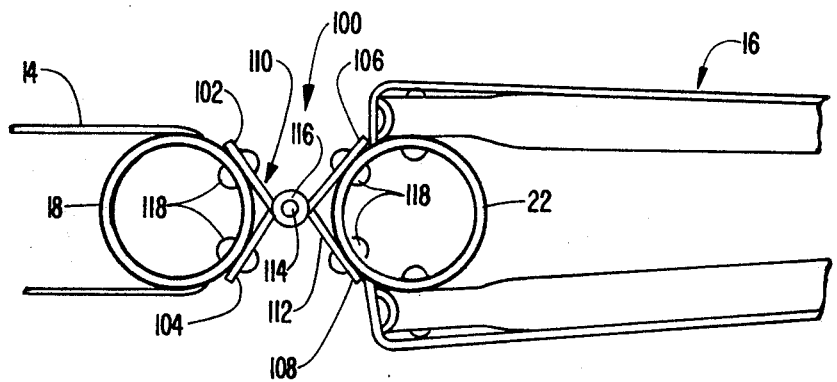
FIG. 5 is a section similar to FIG. 2 showing the existing hinge replaced by the improved hinge of FIGS. 3 and 4.

Referring first to FIGS. 3-5 there is illustrated an improved hinge 100 according to the invention for use as an ultralight rudder hinge. In contrast to the prior rudder hinge 10 of FIGS. 1 and 2, the improved hinge 100 has four leaves 102, 104, 106 and 108. Leaves 102,104 constitute a first leaf pair 110. Leaves 106, 108 constitute a second leaf pair 112. These leaf pairs are pivotally joined by pivot means 114 along edges of the leaves for relative pivotal rotation of the leaf pairs about a pivot axis 116 extending along the leaf edges.

Referring to FIG. 5, the improved hinge 100 is installed in an ultralight rudder assembly 12 between the trailing edge tube 18 of the vertical stabilizer 14 and the leading edge tube 22, of the rudder 16. The stabilizer tube 18 is disposed between and attached by rivets 118 to the two leaves 102, 104 of hinge leaf pair 110. The rudder tube 22 is disposed between and attached by rivets 118 to the two leaves 106, 108 of the hinge leaf pair 112. The pivot axis 116 of the hinge is located between and in a plane containing the central axes of the tubes 18, 22 and parallels the tube axes. An ultralight rudder assembly may have two or more of the hinges 100 spaced along the tubes 18, 22 or a single hinge extending the length of the tubes. The illustrated rudder assembly has a pair of aligned hinges 100.

A significant advantage of the improved rudder hinge 100 over the prior FAA approved hinge 10 of FIGS. 1 and 2 is obvious from FIG. 5. Thus, it will be observed that the two leaves 102, 104 of leaf pair 110 are inclined to one another so that each leaf reinforces the other leaf against bending in the region between its attachment rivets 118 and the hinge pivot means 114. Similarly, the two leaves 106, 108 of leaf pair 112 are inclined to one another so that each leaf resists bending of the other leaf in the region between its attachment rivets 118 and the hinge pivot means. Thus, the present improved hinge 100 eliminates the hinge leaf stress points 28a of the rudder prior hinge 10 at which its hinge leaves were prone to bending and, more seriously, to fatigue stress failure.

Referring in more detail to the illustrated hinge 100, the two hinge leaves 102, 104 of leaf pair 110 and the two hinge leaves 106, 108 of leaf pair 112, as well as the leaf pairs themselves, are pivotally joined by the pivot means 114. Thus, not only can the hinge leaf pairs pivot relative to one another but so also can the two leaves of each hinge pair. This ability of the two leaves of each hinge pair to pivot relative to one another has the advantage of permitting adjustment of the leaves to accommodate tubes of different diameters.

To this end, each hinge leaf 102, 104, 106, 108 is a metal strip or plate having one edge portion slotted and curled to form a plurality of coaxial bearing sleeves 120 opposed along the leaf edge. The bearing sleeves of the four hinge leaves are designated 120a, 120b, 120c and 120d, respectively. These several bearing sleeves are staggered axially of the pivot axis 116, as shown and are coaxially aligned. Extending through the several bearing sleeves is a pivot pin 122. It will be observed that the several bearing sleeves are axially sized so that the ends of adjacent sleeves are contiguous or in contact so that they restrain the hinge leaves against relative movement or displacement along the pivot axis 116. The improved hinge 100 is thus essentially a modified piano hinge having four leaves instead of two.

Figure 6:
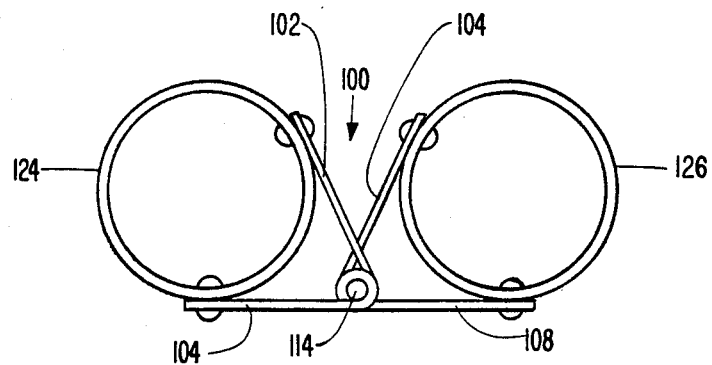
FIG. 6 illustrates a four leaf hinge according to the invention used as an ultralight alerion or rudder hinge.

FIG. 6 illustrates the four leaf hinge 100 of the invention used as an ultralight flap or elevator hinge. In this figure, reference numerals 124, 126 denote, respectively, the trailing edge frame tube of an ultralight wing and the leading edge frame tube of an ultralight flap, or the trailing edge frame tube of an ultralight horizontal stabilizer and the leading edge frame tube of an ultralight elevator. The hinge 100 is attached to the tubes 124, 126 in essentially the same way as the rudder hinge except that the hinge pivot means 114 is located in a plane tangent to both tubes when the flap or elevator, as the case may be, is in its neutral position. The two hinge leaves 104, 108 are then substantially coplanar and effectively bridge the space between the wing and flap or stabilizer and elevator to preserve smooth airflow over their lower surface.

It is evident that in the ultralight applications discussed above, both halves of the hinge are subject to bending moments which would bend or cause fatigue failure of the hinge leaves if they did not resist bending of one another as explained. Accordingly, both halves of the hinge must comprise a pair of hinge leaves which reinforce one another against bending.

Figure 7:
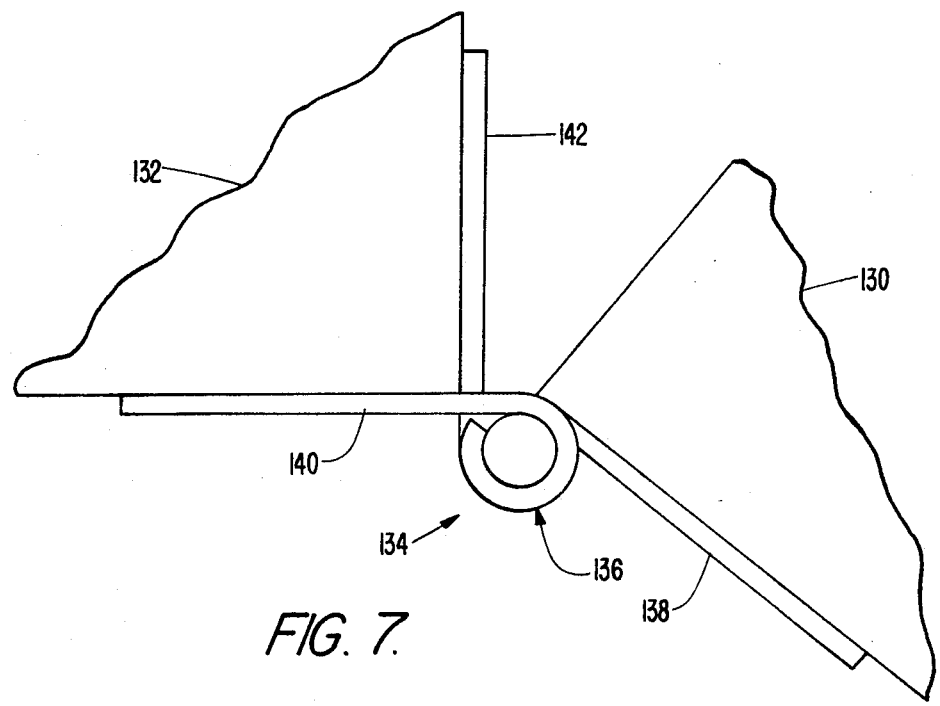
FIG. 7 is a section through a three leaf door hinge according to this invention.

FIG. 7 illustrates an application of the hinge in which only one-half of the hinge is subjected to a bending moment so that only this hinge half need comprise a pair of hinge leaves. Accordingly, the hinge need have only three leaves.

In FIG. 7, 130 is a door attached to a door frame 132 by three leaf hinges 134 according to the invention. Each hinge 134 is identical to the four leaf hinge 100 except that one leaf is omitted, and the hinge pivot means 136 is modified accordingly. Hinge 134 has a single leaf 138 secured to the door 130 and a pair of leaves 140, 142 secured to the door frame 132 with the leaves inclined at right angles to one another.

In the application, it is evident that the single hinge leaves 138 attached to the door 130 are subjected only to in-plane forces, that is forces acting edgewise of the leaves. These leaves are thus not subjected to any bending moments which need be resisted by second hinge leaves attached to the door at angles to the leaves 138. Rotation of the door 130 about its hinge axis, on the other hand, produces bending mements on the door frame hinge leaves 140, 142 which could cause bending of the leaves if either leaf were omitted. Each leaf 140, 142 of each hinge leaf pair attached to the door frame resists bending of the other leaf of the pair in the same manner as in the four leaf hinge 100.

The two hinge leaves of each leaf pair of the hinges described to this point are pivotally joined by the hinge pivot means. As noted earlier, one advantage of this pivotal joining of the two leaves of a leaf pair is the ability to adjust the two leaves relative to one another. In the absence of any need for this adjustment or other reasons for pivotally joining the two leaves of a leaf pair, the two leaves of either or both leaf pairs of a present hinge may be rigidly joined.

Figure 8:
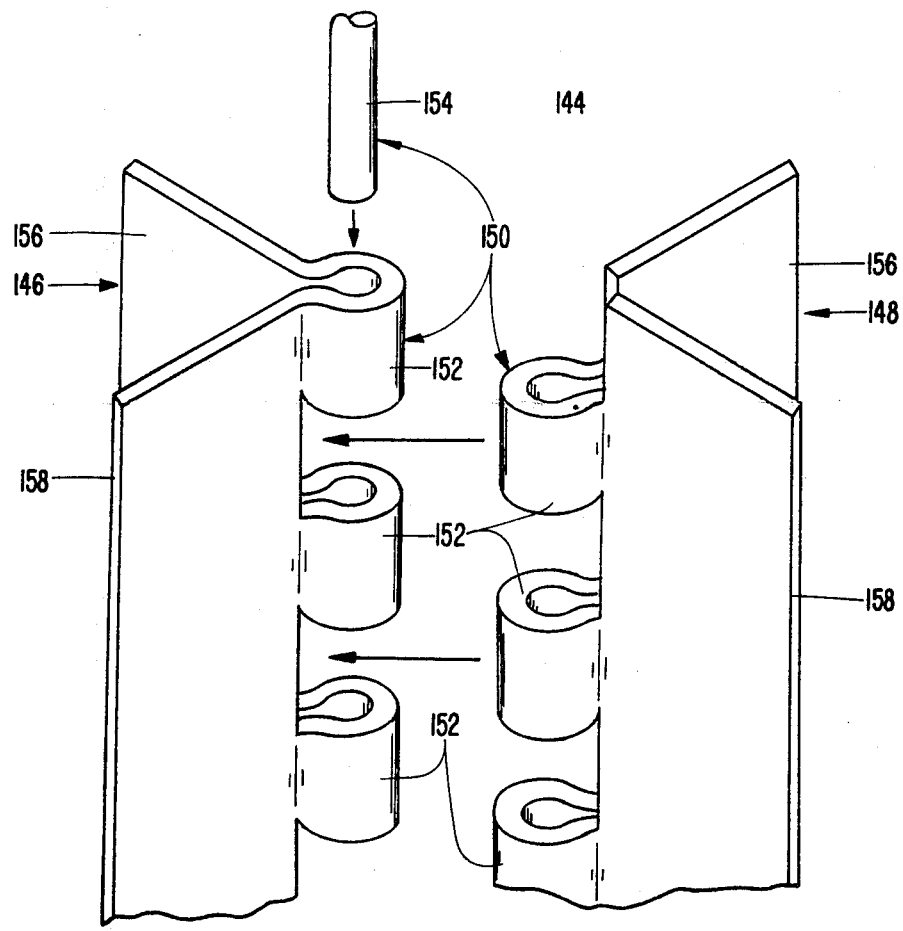
FIG. 8 is an exploded section through a modified hinge according to the invention.

FIG. 8 illustrates a modified four leaf hinge 144 according to the invention with such rigidly joined hinge leaves. Hinge 144 includes two hinge members 146, 148 to be pivotally joined by hinge means 150 including staggered bearing sleeves 152 through which extends a pivot pin 154. Each hinge member 146, 148 has a pair of hinge leaves 156, 158 rigidly joined to one another and to the respective bearing sleeves 152 with leaves disposed at a desired fixed angle to one another. The hinge members 146, 148 may be fabricated in various ways, such as by bending the members from sheet metal and then slotting them to form the staggered bearing sleeves. The hinge members could also be formed by extrusion and then slotted to form the bearing sleeves.

What is claimed:

1. A hinge for pivotally joining two members comprising:
   separate hinge leaves including at least one pair of separate hinge leaves to be secured to one member and at least one additional leaf to be secured to the other member, and each hinge leaf comprising an elongate strip having longitudinal edges,
   rotary bearing means pivotally joining said hinge leaves along longitudinal edges thereof for independent rotation of each leaf relative to each remaining leaf about a pivot axis extending lengthwise of the leaves and comprising bearing sleeves on the hinge leaves along longitudinal edges of the leaves disposed in close end to end coaxial relation, and a hinge pin extending through the bearing sleeves, and wherein
   (a) all of said bearing sleeves have approximately the same length and spacing along said axis, (b) each hinge leaf comprises at least one pair of coaxial bearing sleeves, (c) each pair of adjacent bearing sleeves on each hinge leaf straddle bearing sleeves on all of the other leaves but only a single bearing sleeve on each of the other hinge leaves, (d) the two hinge leaves of each leaf pair define therebetween an included angle and are relatively rotatable on said axis to vary said included angle, and (e) the two hinge leaves of each leaf pair are adapted to straddle their respective one of the members joined by the hinge, whereby each leaf of each leaf pair resists bending of the other leaf of the respective leaf pair.

2. A hinge according to claim 1 wherein:
   said hinge comprises four separate independently rotatable hinge leaves including two hinge leaf pairs.

3. In combination:
   a pair of elongate members to be pivotally joined,
   a hinge pivotally joining said members comprising at least one pair of separate hinge leaves secured to one member and at least one additional leaf secured to the other member, each hinge leaf comprising an elongate strip extending lengthwise of its respective member and having longitudinal edges, and
   rotary bearing means pivotally joining said hinge leaves along longitudinal edges thereof for independent rotation of each leaf relative to each remaining leaf about a pivot axis extending lengthwise of the leaves, said rotary bearing means comprising bearing sleeves on the hinge leaves along longitudinal edges of the leaves disposed in close end to end coaxial relation, and a hinge pin extending through the bearing sleeves, and wherein
   (a) all of said bearing sleeves have approximately the same length and spacing along said axis, (b) each hinge leaf comprises at least one pair of coaxial bearing sleeves, (c) each pair of adjacent bearing sleeves on each hinge leaf straddle bearing sleeves on all of the other leaves but only a single bearing sleeve on each of the other hinge leaves, (d) the two hinge leaves of each leaf pair define therebetween an included angle and are relatively rotatable on said axis to vary said included angle, and (e) the two hinge leaves of each leaf pair are adapted to straddle their respective one of the members joined by the hinge, whereby each leaf of each leaf pair resists bending of the other leaf of the respective leaf pair.

4. A combination according to claim 3 wherein: said hinge comprises four separate independently rotatable hinge leaves including two hinge leaf pairs secured to said members, respectively.

* * * * *